United States Patent [19]
Urano et al.

[11] Patent Number: 5,798,899
[45] Date of Patent: Aug. 25, 1998

[54] TAPE CARTRIDGE WITH AN UPPER CASE WALL COVER PLATE

[75] Inventors: Kazuaki Urano, Mishima-gun; Yoshimi Maehara, Kyoto; Hiroshi Ohkubo; Takashi Miyamoto, both of Tokyo, all of Japan

[73] Assignees: Hitachi Maxwell, Ltd., Osaka-fu; TAEC Corporation, Tokyo-to, both of Japan

[21] Appl. No.: 396,581

[22] Filed: Mar. 1, 1995

Related U.S. Application Data

[63] Continuation of Ser. No. 208,904, Mar. 11, 1994, abandoned, which is a continuation of Ser. No. 908,787, Jul. 6, 1992, abandoned, which is a continuation of Ser. No. 599,797, Oct. 19, 1990, abandoned.

[30] Foreign Application Priority Data

Oct. 20, 1989 [JP] Japan ................. 1-274043

[51] Int. Cl.$^6$ ........................... G11B 23/02
[52] U.S. Cl. ................................. 360/132
[58] Field of Search ................. 360/132, 133, 360/137; 242/347

[56] References Cited

U.S. PATENT DOCUMENTS

| | | | |
|---|---|---|---|
| 3,420,463 | 1/1969 | Cousino | 360/132 |
| 3,601,654 | 8/1971 | Long | 360/132 |
| 3,848,265 | 11/1974 | Biery et al. | 360/132 |
| 3,900,170 | 8/1975 | Serizawa | 360/132 |
| 4,333,568 | 6/1982 | Weldin | 360/132 |
| 4,405,098 | 9/1983 | Spicer | 360/132 |
| 4,501,396 | 2/1985 | Tomsyck et al. | 360/132 |
| 4,530,475 | 7/1985 | Buerkle et al. | 360/132 |
| 4,742,416 | 5/1988 | Oishi et al. | 360/132 |
| 4,816,953 | 3/1989 | Ohyama et al. | 360/132 |
| 4,853,816 | 8/1989 | Satoh et al. | 360/132 |
| 4,945,440 | 7/1990 | Iwahashi et al. | 360/132 |
| 4,965,690 | 10/1990 | Tanaka et al. | 360/132 |
| 5,038,235 | 8/1991 | Ohzawa et al. | 360/137 |

FOREIGN PATENT DOCUMENTS

| | | | |
|---|---|---|---|
| 1157943 | 11/1983 | Canada | 360/132 |
| 52-38194 | 5/1977 | Japan . | |
| 56-34170 | 4/1981 | Japan | 360/132 |
| 58-53063 | 3/1983 | Japan | 360/132 |
| 58-146069 | 8/1983 | Japan | 360/132 |
| 130089 | 1/1989 | Japan | 360/60 |
| 0675172 | 8/1990 | Switzerland | 360/60 |
| 1454764 | 11/1976 | United Kingdom | 360/132 |

*Primary Examiner*—Stuart S. Levy
*Assistant Examiner*—David D. Davis

[57] ABSTRACT

A tape cartridge comprising a housing case which comprises an upper wall and a lower wall both having a pair of holes for receiving driving shafts and a covering plate which covers the holes on the upper wall, the upper and lower sides of which can be clearly identified so that misloading is prevented.

13 Claims, 3 Drawing Sheets

TAPE CARTRIDGE WITH AN UPPER CASE WALL COVER PLATE

This application is a continuation of application Ser. No. 08/208,904 filed on Mar. 11, 1994, which was a continuation of application Ser. No. 07/908,787 filed on Jul. 6, 1992, which was a continuation of application Ser. No. 07/599,797 filed Oct. 19, 1990, all now abandoned.

BACKGROUND OF THE INVENTION

1. Field of the Invention

The present invention relates to a tape cartridge which is suitable for use with a data recorder, namely for data backup of a computer. In particular, the present invention relates to an improvement of a shape of an upper case wall of the tape cartridge.

2. Description of the Related Art

A tape cartridge for data recording has substantially the same appearance and shape as a usual audio tape cartridge except that the latter is used with turning over upper and lower sides, while the former is used without such turn over. In both the tape cartridge for data recording and the audio tape cartridge, a pair of holes for receiving driving shafts are formed on upper and lower walls of the cartridge at vertically corresponding positions (see Japanese Utility Model Kokai Publication No. 38194/1977). Therefore, in both types of tape cartridges, the upper and lower walls are identified with markings "A" and "B" sides on the respective walls.

The tape cartridge for data recording is loaded in a loading mouth from one of the side walls of the cartridge. In this case, the upper and lower walls may not be clearly identified with the marks of "A" and "B" sides, so that the cartridge may be loaded on the wrong side.

By paying attention to the fact that the tape cartridge for data recording is used without turning over the upper and lower sides, the cartridge can be designed to have no holes for receiving the driving shafts on the upper wall ("A" side) similar to a VHS cassette. However, the driving shaft of a presently used data recorder has a sufficient length to reach the hole on the "A" side as illustrated in FIG. 2. Therefore, the simple elimination of the holes from the upper wall cannot be applied to the tape cartridge when the tape cartridge is used in the data recorder and in an automatic reversing type audio tape recorder.

SUMMARY OF THE INVENTION

One object of the present invention is to provide a tape cartridge with "A" and "B" sides which are easily identified so as to prevent misleading.

Another object of the present invention is to provide a tape cartridge for data recording which can be used in a recorder having a driving shaft with a conventional length.

A further object of the present invention is to provide a tape cartridge which can carry as much information as possible on its wall(s).

According to the present invention, there is provided a tape cartridge comprising a housing case which comprises an upper wall and a lower wall both having a pair of holes for receiving driving shafts and a covering plate which covers the holes on the upper wall.

The foregoing and other objectives of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE DRAWINGS

Figure 1:
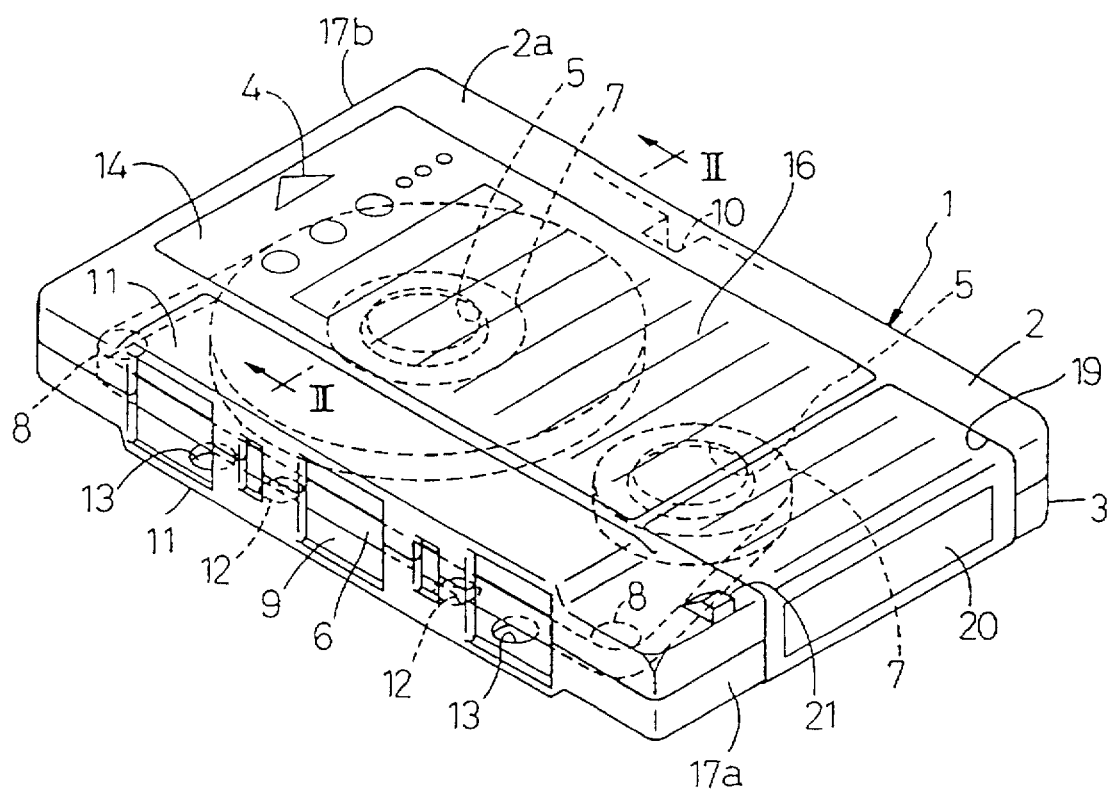
FIG. 1 is a perspective view of an embodiment of a tape cartridge of the present invention.
Figure 2:
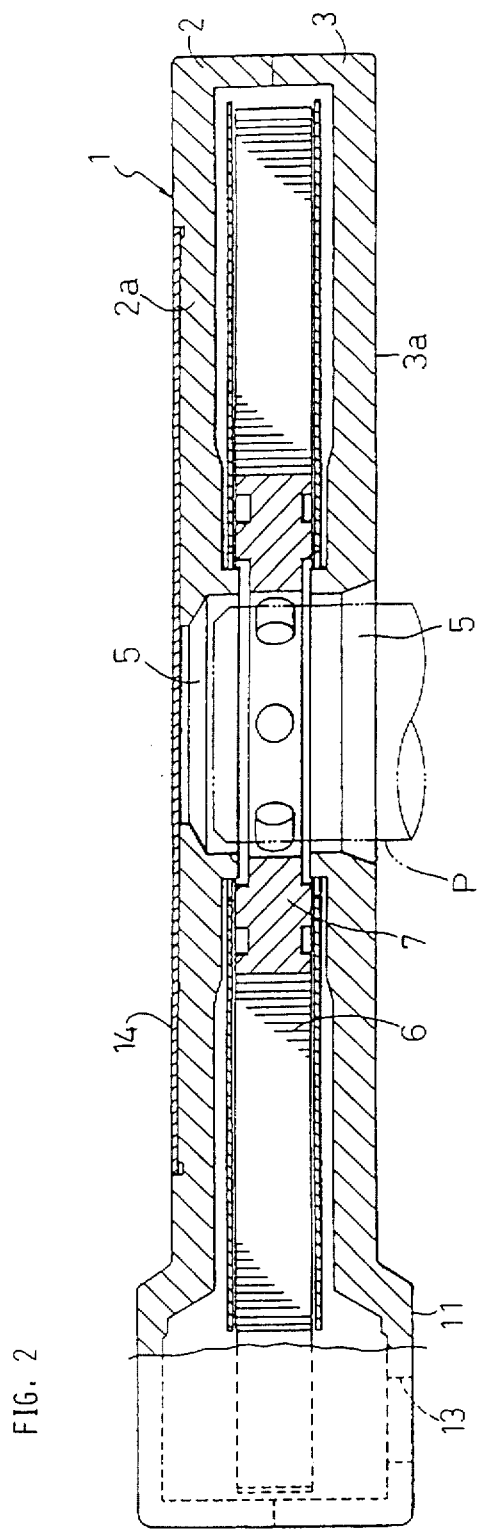
FIG. 2 is an enlarged cross sectional view of the tape cartridge of FIG. 1 along the line II—II.
Figure 3:
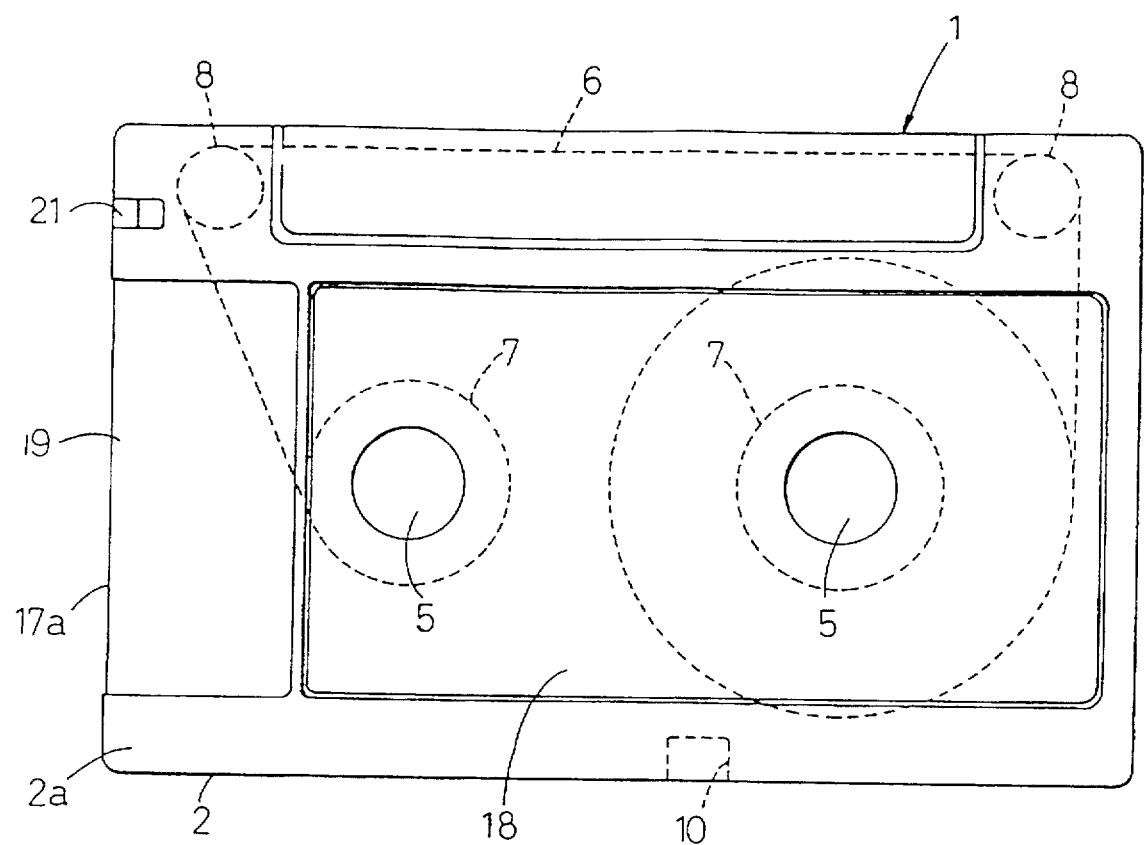
FIG. 3 is a plane view of the tape cartridge of FIG. 1 without the covering plate and title labels.

An embodiment of the tape cartridge of the present invention is illustrated in FIGS. 1, 2 and 3.

The tape cartridge of the present invention has a housing case 1 which comprises an upper wall 2a and a lower wall 3a. Each wall has a pair of holes 5 for receiving driving shafts. Further, the tape cartridge of the present invention comprises a covering plate 14 for covering the holes 5 on the upper wall 2a.

The covering plate 14 has a sufficient area for covering both holes 5, and its outside surface may have an area 16 for displaying informations.

It is possible to adhere a title label 20 on one side wall 17a on a rear side of the cartridge in the loading direction.

Since the holes on the upper wall 2a are present, the tape cartridge of the present invention can be used in the conventional data recorder.

Since the holes 5 for receiving the driving shafts are covered with the covering plate 14, the upper and lower sides of the tape cartridge can be easily indentified through visibility of the holes, so that the tape cartridge is not loaded in the recorder up-side down.

On the outside surface of the covering plate 14, the area for displaying information can be provided without any trouble.

When the title label 20 is adhered to the side wall 17a on the rear side of the cartridge, the desired tape cartridge can be easily found. Further, the tape cartridge can be correctly loaded in the recorder when it is loaded by placing the title label 20 on the user side. In combination with the covering plate 14, the adhered label can prevent misloading of the tape cartridge.

The present invention will be explained further in detail by making reference to the accompanying drawings.

The tape cartridge of FIGS. 1 and 2 has substantially the same basic structure as the audio tape cartridge.

The housing case 1 consists of upper and lower cases 2, 3 which are integrated together with suitable means such as screws or adhesives. Each of the upper wall 2a of the upper case 2 and the lower wall 3a of the lower case 3 has a pair of holes 5 for receiving the driving shafts. Corresponding holes in the upper and lower walls have their centers on a common center line. Around each hole for receiving the driving shaft, a hub for winding a tape 6 is installed with free rotation. The tape 6 is unwound from one hub 7, is run on guide rails 8,8 and is wound on the other hub 7. The housing case has a magnetic head-receiving window 9 at a front center part of the case 1 which faces a tape running path between the rolls 8,8. In this embodiment, no head pad is installed inside the head-receiving window in view of high speed tape feeding.

At a center part on a rear edge of the housing case, a depression 10 is formed to identify the direction of signal recording. Rear and lower sides of the depression are open but an upper side of the depression is closed.

On a trapezoid form protuberance 11 formed on a front side of the lower case 3, there are provided standard holes 12, 12 for positioning the cartridge and holes 13, 13 which correspond to holes for receiving capstans in the case of the audio tape cartridge. In the tape cartridge of FIGS. 1, 2 and 3 for data backup, one of the holes 13, 13 receives the capstan shaft and the other receives a sensor for searching queue indexes. The holes 12 and 13 are not formed in the upper wall 2a of the upper case 2. This is because a depth with which a pin for positioning or the sensor for searching the queue indexes are received by the hole 12 or 13 is smaller than the distance to reach an inside surface of the upper wall 2a.

Substantially the whole area of the outside surface of the upper wall 2a of the housing case 1 is covered with the covering plate 14 to shield the holes 5, 5. More specifically, as shown in FIG. 3, a shallow depressed part 18 having a depth corresponding to a thickness of the cove-ring plate 14 is formed on the outside surface of the upper wall 2a, and the covering plate 14 is placed in the depressed part 18 and adhered to the upper wall 2a.

When the covering plate 14 is adhered, the depth of the hole 5 in the upper wall corresponding to the thickness of the wall still remains. Therefore, the driving shaft P of the data recorder or the audio recorder can be received. In general, a tip of the driving shaft reaches the middle part in the depth direction of the hole 5 in the upper case 2.

The covering plate has a thickness of 0.1 to 0.3 mm, preferably 0.15 to 0.2 mm. It may be a metal plate such as an aluminum or stainless steel plate. The outside surface may have a printing for indicating a brand name or quality and also for decoration. Also, the area 16 on which the user can write various informations exists. Since the metal covering plate 14 has enough strength even when it is thin, it may act as a board laid under writing paper which prevents the falling of a tip of writing means such as a pencil into the hole 5. The covering plate 14 may be made of a cardboard or a hard plastic plate. On the covering plate 14, a mark 4 for identifying a loading direction is preferably printed for easy identification of the loading direction.

On either of the side walls 17a and 17b, in the case of the tape cartridge Of FIG. 1, on the side wall 17a, a shallow depressed part 19 is formed to provide an area for adhering a title label 20. When the title label 20 is also adhered to the depressed part 19, not only the title is easily read when the tape cartridge is loaded in the recorder, but also the loading direction of the tape cartridge is more easily recognized. In this case, when the title label 20 is adhered bridging the side wall 17a and at least the upper wall 2a and optionally the lower wall 3a, it is less easily peeled off and an amount of information to be recorded on the title label is increased.

At the rear edge of the upper wall 2a of the upper case 2, a protuberance 21 for preventing misloading of the cartridge tape is integrally provided to prevent misloading of the cartridge tape through contact of the protuberance 21 to a part of the recorder.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A tape cartridge, comprising:
   an upper wall;
   a lower wall;
   first and second side walls;
   said upper and lower walls each having:
      a pair of through holes corresponding in a manner for receiving driving shafts of a recording/playback device into which the tape cartridge is to be inserted;
   wherein said upper wall, lower wall, and first and second side walls form a housing case such that the shafts of the recording/playback device can pass through the pair of through holes in the lower wall and extend partially into the pair of through holes in the upper wall;
   a covering plate, fixed only to said upper wall, for covering up said pair of through holes in said upper wall so as to visually deter misleading of said housing case in said recording/playback device;
   wherein said upper wall also has a shallow depression, having a depth corresponding to a thickness of said covering plate over substantially an entire outside surface of said upper wall, for receiving said covering plate; and
   an asymmetrically-shaped projection on said outside surface of said upper wall, having no complementarily-shaped projection on said lower wall, for preventing loading of said housing case into said recording/playback device in a first direction parallel to said upper and lower walls, and for permitting loading in a second direction opposite to said first direction.

2. The tape cartridge according to claim 1, wherein said covering plate is a metal plate.

3. The tape cartridge according to claim 2, wherein said metal covering plate is a stainless steel plate.

4. The tape cartridge according to claim 1, wherein said covering plate has an outer surface for displaying information thereupon.

5. The tape cartridge according to claim 1, wherein at least one of said side walls receives information thereon toward a rear of said tape cartridge, in a loading direction.

6. The tape cartridge according to claim 1, wherein said asymmetrically-shaped protuberance is trapezoidally-shaped.

7. The tape cartridge according to claim 1, wherein one of said first and second side walls has a recess to identify a direction of signal recording.

8. A tape cartridge, comprising:
   an upper wall;
   a lower wall; and
   first and second side walls;
   said upper and lower walls each having:
      a pair of through holes corresponding in a manner for receiving driving shafts of a recording/playback device into which the tape cartridge is to be inserted;

wherein said upper wall, lower wall, and first and second side walls form a housing case such that the shafts of the recording/playback device can pass through the pair of through holes in the lower wall and extend partially into the pair of through holes in the upper wall; and an asymmetrically-shaped projection on an outside surface of said upper wall, having no complementarily-shaped projection on said lower wall, for preventing loading of said housing case into said recording/playback device in a first direction parallel to said upper and lower walls, and for permitting loading in a second direction opposite to said first direction.

9. The tape cartridge according to claim 14, further including:

a covering plate, fixed only to said upper wall, for covering up said pair of through holes in said upper wall so as to visually deter misloading of said housing case in said recording/playback device;

wherein said upper wall also has a shallow depression, having a depth corresponding to a thickness of said covering plate over substantially an entire outside surface of said upper wall, for receiving said covering plate.

10. The tape cartridge according to claim 1, wherein said asymmetrically-shaped protuberance is trapezoidally-shaped.

11. The tape cartridge according to claim 1, wherein one of said first and second side walls has a recess to identify a direction of signal recording.

12. A tape cartridge, comprising:

an upper wall;

a lower wall;

a front edge wall and a rear edge wall;

first and second side walls;

said upper and lower walls each having:

a pair of through holes corresponding in a manner for receiving driving shafts of a recording/playback device into which the tape cartridge is to be inserted;

wherein said upper wall, lower wall, and first and second side walls form a housing case such that the shafts of the recording/playback device can pass through the pair of through holes in the lower wall and extend partially into the pair of through holes in the upper wall; and an asymmetrically-shaped projection on an outer surface of said upper wall for preventing loading of said housing case into said recording/playback device in a first direction parallel to said upper and lower walls and for permitting loading in a second direction opposite to said first direction, wherein one of said first and second sidewalls has at least one aperture through which access can be had to tape contained by said tape cartridge; and wherein said upper and lower walls have a protuberance, each protuberance forming a boundary of said at least one aperture.

13. The tape cartridge according to claim 18, further including:

a covering plate, fixed only to said upper wall, for covering up said pair of through holes in said upper wall so as to visually deter misloading of said housing case in said recording/playback device;

wherein said upper wall also has a shallow depression, having a depth corresponding to a thickness of said covering plate over substantially an entire outside surface of said upper wall, for receiving said covering plate.

* * * * *

UNITED STATES PATENT AND TRADEMARK OFFICE
CERTIFICATE OF CORRECTION

PATENT NO.   : 5,798,899
DATED        : August 25, 1998
INVENTOR(S)  : Kazuaki URANO et al.

It is certified that error(s) appears in the above-identified patent and that said Letters Patent is hereby corrected as shown below:

On the title page:

change "[73] Assignees: Hitachi Maxwell, Ltd., Osaka-fu;
                                    TAEC Corporation, Tokyo-to, both of Japan"
to --[73] Assignees: Hitachi Maxell, Ltd., Osaka-fu;
                            TEAC Corporation, Tokyo-to, both of Japan--

Signed and Sealed this

Twenty-third Day of February, 1999

*Attest:*

Q. TODD DICKINSON

*Attesting Officer*          *Acting Commissioner of Patents and Trademarks*